(12) United States Patent
Bedard et al.

(10) Patent No.: US 6,379,641 B1
(45) Date of Patent: Apr. 30, 2002

(54) MICROPOROUS RARE EARTH SILICATES AND METHOD OF PRODUCING SAME

(75) Inventors: Robert L. Bedard, Mc Henry; Jana L. Gisselquist, Chicago; Lisa M. King, Crystal Lake; Elaine F. Schumacher, Arlington Heights, all of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/562,730

(22) Filed: May 1, 2000

(51) Int. Cl.[7] .............................................. C01B 33/20
(52) U.S. Cl. .................... 423/326; 423/327.1; 423/331; 423/332; 423/593
(58) Field of Search ................................ 423/332, 366, 423/326, 327.1, 593, 331; 502/407, 406, 210, 242, 243, 349, 352

(56) References Cited

U.S. PATENT DOCUMENTS

| | | | |
|---|---|---|---|
| 3,716,596 A | * 2/1973 | Bowes .................... 260/671 C |
| 4,097,345 A | * 6/1978 | Shannon ....................... 204/59 |
| 4,310,440 A | 1/1982 | Wilson et al. ............... 252/435 |
| 4,440,871 A | 4/1984 | Lok et al. .................... 502/214 |
| 4,853,197 A | 8/1989 | Wilson et al. ............... 423/306 |
| 5,302,362 A | 4/1994 | Bedard ....................... 423/306 |
| 5,518,707 A | * 5/1996 | Bedard et al. ............... 423/700 |
| 6,087,545 A | * 7/2000 | Choudhary et al. ......... 585/658 |

* cited by examiner

Primary Examiner—Steven P. Griffin
Assistant Examiner—Edward M. Johnson
(74) Attorney, Agent, or Firm—John G. Tolomei; Frank S. Molinaro

(57) ABSTRACT

Crystalline microporous rare earth silicates are provided. These microporous compositions have a three dimensional framework structure of at least silicon tetrahedral oxide units and at least one M oxide unit. M is a rare earth element. Optionally, the microporous compositions may contain as part of the framework an M' element having a valence of +2, +3, +4 or +5 such as zinc (+2), iron (+3), zirconium (+4) and tantalum (+5). The composition is represented by the empirical formula:

$$A_n(M_{1-z}M'_z)_w Si_{1-y} Ge_y O_x$$

where A is a cation such as sodium and "n", "z", "w", "y" and "x" are the mole fractions of the various elements.

20 Claims, No Drawings

MICROPOROUS RARE EARTH SILICATES AND METHOD OF PRODUCING SAME

FIELD OF THE INVENTION

This invention relates to microporous rare earth silicate compositions having a three dimensional framework structure, which contains at least silicon and one rare earth element as framework elements. The composition is represented by the empirical formula:

$$A_n(M_{1-z}M'_z)_w Si_{1-y}Ge_y O_x.$$

BACKGROUND OF THE INVENTION

Microporous crystalline compositions have many industrial uses and thus are the subject of numerous research projects in both industry and academia. The first microporous compositions to be synthesized were the zeolites which are crystalline aluminosilicate compositions, and which are formed from corner sharing $AlO_2$ and $SiO_2$ tetrahedra. Zeolites are characterized by having pore openings of uniform dimensions, having a significant ion-exchange capacity, and being capable of reversibly desorbing an adsorbed phase which is dispersed throughout the internal voids of the crystal, without significantly displacing any atoms which make up the permanent zeolite crystal structure. Investigation of zeolites and their structures led to the synthesis of non-zeolitic molecular sieves which are defined as crystalline compositions which contain in their framework structure, elements other than aluminum and silicon, but which exhibit the ion-exchange and/or adsorption characteristics of zeolites. These include: 1) crystalline aluminophosphate compositions disclosed in U.S. Pat. No. 4,310,440; 2) silicon substituted aluminophosphates as disclosed in U.S. Pat. No. 4,440,871, 3) metal substituted aluminophosphates as disclosed in U.S. Pat. No. 4,853,197; and 4) metallo zinc-phosphate compositions disclosed in U.S. Pat. No. 5,302,362. Non-zeolitic molecular sieves also include crystalline metal sulfide molecular sieves as disclosed in U.S. Pat. No. 4,880,761.

There are also several reports dealing with microporous rare earth silicates. For example, J. Rocha, et al. in *Chem. Commun.*, (1997) 2103, disclosed the preparation and characterization of a composition having the bulk chemical formula of: $Na_2KYSi_8O_{19}.5H_2O$. This material was identified as AV-1 and shown to have yttrium and silicon in the framework. There are also a number of articles by S. M. Haile and co-workers in which a number of neodymium and yttrium silicates with either sodium or potassium as the alkali metal are disclosed. These articles are 1) S. M. Haile, et al., "Crystallography and Composition of Some New Potassium-Neodymium Silicates", *Transaction of the American Crystallographic Association*, Vol. 27, (1991) 77; S. M. Haile et al., "Synthesis Structure and Ionic Conductivity of $K_3NdSi_6O_{15}$", *Material Research Society Symposium Proceedings*, Vol. 210 (1991) 645; S. M. Haile et al., "Conductivity and Crystallography of New Alkali Rare Earth Silicates Synthesized as Possible Fast-Ion Conductors", *Solid State Ionics*, 53–56 (1992) 1292–1301; S. M. Haile et al., "Anisotropy in the Ionic Conductivity of $K_3NdSi_3O_8(OH)_2$", *Fast Ion Transports and Solids*, (1993) 315–326; S. M. Haile, et al. "Hydrothermal Synthesis of New Alkali Silicates I. Potassium Neodymium Phases", *Journal of Crystal Growth*, 131 (1993) 352–372; S. M. Haile, et al., "Hydrothermal Synthesis of New Alkali Silicates, II; Sodium Neodymium and Sodium Yttrium Phases", *Journal of Crystal Growth*, 131 (1993) 373–386; S. M. Haile et al. "Structure of $Na_3NdSi_6O_{15}.H_2O$—A Layered Silicate With Paths for Possible Fast Ion Conduction", *Acta Cryst.* (1997), B53, 7–17. A. N. Christensen, et al. in *Acta Chemica Scandinavica*, (1997) 51: 37–43 disclosed the synthesis of rare earth disilicates, while R. D. Shannon et al., in *Phys. Chem. Minerals*, 5, (1980) 245–253 disclosed the synthesis of sodium rare earth silicates which include yttrium, gadolinium, samarium, and dysprosium. Finally, R. D. Shannon et al. in *Inorganic Chemistry*, 17 (4), 958–964 (1978), disclose the ionic conductivity of a $Na_5YSi_4O_{12}$ silicate.

Applicants have now synthesized crystalline microporous rare earth silicates, which are different from those enumerated above. These compositions can be described by the empirical formula:

$$A_n(M_{1-z}M'_z)_w Si_{1-y}Ge_y O_x.$$

where A is a cation selected from the group consisting of alkali metals, alkaline earth metals, hydronium ion and mixtures thereof, "n" is the mole fraction of A and varies from about 0.5 w to about 4 w, M is at least one element selected from the group of rare earth elements, except that when "z" is zero, M is not neodymium or yttrium, "z" is the mole fraction of M' and varies from 0 to about 0.99, M' is a metal having a valence of +2, +3, +4 or +5, "w" is the mole fraction of the sum of M and M' and varies from about 0.1 to about 0.5, "y" is the mole fraction of germanium and varies from 0 to about 0.99 and "x" has a value such that it satisfies the valence of the framework elements. As will be shown in detail, the members of the family of rare earth silicates synthesized and characterized by applicants either have crystal structures which are different from those previously disclosed or contain rare earth elements in the structure which have not been synthesized before.

SUMMARY OF THE INVENTION

As stated, this invention relates to a new family of crystalline microporous rare earth silicates and a method of preparing them. Accordingly, one embodiment of the invention is a crystalline microporous composition having a three dimensional framework structure of at least silicon tetrahedral oxide units and at least one M oxide unit and having an empirical formula on an anhydrous basis of:

$$A_n(M_{1-z}M'_z)_w Si_{1-y}Ge_y O_x.$$

where A is a cation selected from the group consisting of alkali metals, alkaline earth metals, hydronium ion and mixtures thereof, "n" is the mole fraction of A and varies from about 0.5 w to about 4 w, M is at least one element selected from the group of rare earth elements, except when "z" is zero, M is not neodymium or yttrium, "z" is the mole fraction of M' and varies from 0 to about 0.99, M' is a metal having a valence of +2, +3, +4 or +5, "w" is the mole fraction of the sum of M and M' and varies from about 0.1 to about 0.5, "y" is the mole fraction of germanium and varies from 0 to about 0.99 and "x" has a value such that it satisfies the valence of the framework elements.

Another embodiment of the invention is a process for preparing the rare earth silicates described above. The process comprises forming a reaction mixture containing reactive sources of A, M, silicon, optionally M' and optionally germanium, at a temperature and a time sufficient to form the crystalline composition, the mixture having a composition expressed in terms of mole ratios of oxides of:

$$aA_{2/m}O:1-bMO_{h/2}:bM'O_{g/2}:1-cSiO_2:cGeO_2:dH_2O$$

where "a" has a value of about 1 to about 50, "m" is the valence of A and has a value of +1 or +2, "b" has a value from 0 to less than 1.0, "g" has a value of +2, +3, +4 or +5, "h" has a value of +3 or +4, "c" has a value from zero to less than 1.0 and "d" has a value from about 30 to about 2000.

These and other objects and embodiments will become more apparent after the following detailed description of the invention.

DETAILED DESCRIPTION OF THE INVENTION

Applicants have prepared crystalline and microporous rare earth silicates by a hydrothermal synthesis at a relatively low temperature and a relative high pH. Several of these rare earth silicates are characterized by x-ray diffraction patterns which are not associated with any known structures. The rare earth silicates have a three-dimensional framework structure of at least silicon tetrahedral oxide units and at least one rare earth oxide unit. The rare earth metals have a valence of +3 or +4 and a coordination number of 6, 7 or 8. These compositions are described on an anhydrous basis by the empirical formula:

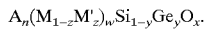

$$A_n(M_{1-z}M'_z)_w Si_{1-y}Ge_y O_x.$$

In this formula, "A", which acts as both a charge balancing cation and a structure directing cation is selected from the group consisting of alkali metals, alkali earth metals, hydronium ion, and mixture thereof. Preferred alkali metals are sodium, potassium, and mixtures thereof, while preferred alkaline earth metals are barium and strontium. The value of "n" which is the mole fraction of A varies from about 0.5 w to about 4 w and is chosen such that the valence neutrality of the composition is achieved. The framework structure is composed of silicon, optionally germanium, at least one rare earth element (M) and optionally an M' metal. The amount of germanium present is represented by "y" which has a value from zero to less than 1.0, which therefore means that the amount of silicon is equal to 1−y. Similarly, the amount of M' metal is represented by "z" which has a value from zero to about 0.99 and thus the amount of rare earth element present is represented by 1−z. The total mole fraction of (M+M') is represented by "w" which has a value from about 0.1 to about 0.5. Finally, the amount of oxygen present is represented by "x" which has a value such that it satisfies the valence of the framework elements. The rare earth elements which are represented by M include yttrium, ytterbium, neodymium, praseodymium, samarium, gadolinium, terbium, dysprosium, holmium, europium, lutetium, promethium, erbium, cerium, lanthanum and thulium. It should be pointed out that when more than one rare earth element is present in the composition, it is the total of the metals which will equal (1−z). That is, $$M_{1-z}=M1_a+M2_b+M3_c+\ldots \text{ where } a+b+c+\ldots =1-z.$$

Similarly, more than one M' metal can be present and each M' metal can have different valences, with the total amount of the M' metals being equal to z. This is represented by the following equation:

$$M'_z=M1'_{a'}+M2'_{b'}+M3'_{c'}+\ldots \text{ where } a'+b'+c'+\ldots =z.$$

The M' metals which can be substituted into the framework include those having a valence of +2, +3, +4 or +5. Examples of these metals include without limitation, zinc (+2), iron (+3), scandium (+3), cobalt (+3), zirconium (+4), titanium (+4), niobium (+5), tantalum (+5) and antimony (+5).

The rare earth silicate microporous compositions described herein are prepared by a hydrothermal crystallization of a reaction mixture prepared by combining reactive sources of silicon, rare earth (M) element, optionally an M' metal, optionally germanium, at least one cation and water. Silicon sources include, without limitation, colloidal silica, fumed silica, tetraethylorthosilicate and sodium silicate. Sources of the M metals include, but are not limited to metal halides, metal nitrates, metal acetates, metal oxides, metal hydrous oxides and mixtures thereof. Specific examples of rare earth compounds include, without limitation, ytterbium chloride, ytterbium oxide, ytterbium nitrate, ytterbium sulfate octahydrate, ytterbium carbonate and ytterbium oxalate. Specific examples for the other rare earths include without limitation the chloride, oxide, nitrate, sulfate and carbonate compounds. Sources of the M' metals also include without limitation the halides, nitrates, acetates, oxides, hydrous oxide and mixtures thereof. Specific examples include without limitation zinc chloride, zinc acetate, iron (III) chloride, iron (III) acetate, cobalt (III) bromide, cobalt (III) acetate, scandium (III) chloride, zirconium oxychloride, zirconium oxyacetate solution, zirconium butoxide, titanium (IV) chloride, titanium (III) chloride solution, niobium (V) chloride, hydrous niobium oxide, tantalum (V) chloride, tantalum ethoxide, antimony (V) oxide, and antimony (V) chloride. Germanium sources include without limitation germanium oxide, germanium alkoxides and germanium tetrachloride. Alkali sources, include without limitation, potassium hydroxide, sodium hydroxide, rubidium hydroxide, cesium hydroxide, sodium carbonate, potassium carbonate, rubidium carbonate, cesium carbonate, sodium halide, potassium halide, rubidium halide, cesium halide, sodium acetate, potassium acetate, cesium acetate and rubidium acetate. Alkaline earth metal sources include without limitation: calcium hydroxide, barium hydroxide, calcium chloride, etc.

Generally, the hydrothermal process used to prepare the rare earth silicate microporous compositions of this invention involves forming a reaction mixture containing reactive sources of the desired components. The reaction mixture can be described in terms of molar ratios of the oxides by the formula:

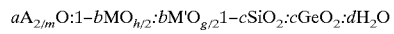

$$aA_{2/m}O:1-bMO_{h/2}:bM'O_{g/2}1-cSiO_2:cGeO_2:dH_2O$$

where "a" has a value of about 1 to about 50 and preferably from about 1 to about 20, "m" is the valence of A and has a value of +1 or +2, "b" has a value from zero to less than 1.0, "g" is the valence of M' and has a value of +2, +3, +4 or +5, "h" is the valence of M and has a value of +3 or +4; "c" has a value from zero to less than 1.0 and "d" has a value from about 30 to about 2000. The basicity of the mixture is controlled by adding excess alkali hydroxide and/or basic compounds of the other constituents of the mixture. Having formed the reaction mixture, it is next reacted at a temperature of about 50° C. to about 300° C. and preferably from about 150° C. to about 250° C. for a period of about 1 hr. to about 30 days in a sealed reaction vessel under autogenous pressure. Optionally, the reaction mixture can be maintained at ambient temperature for a time of about 1 hr. to about 7 days before heating. After crystallization is complete, the solid product is isolated from the heterogeneous mixture by means such as filtration or centrifugation and then washed with deionized water or dilute alkali metal hydroxide solution and dried in air at ambient temperature up to about 100° C. The crystalline rare earth silicates prepared by the process described above are characterized by a three-dimensional framework structure of $SiO_2$ tetrahedral oxide units, at least one rare earth metal oxide unit, optionally an M' metal oxide unit and optionally $GeO_2$ tetrahedral oxide units. Further, the rare earth metals are 6, 7 or 8 coordinate and the M' metals are 4, 5 or 6 coordinate. Finally, these microporous compositions are characterized in that they have crystallographically uniform pores generally having a diameter greater than about 2.6 Å and usually from about 2.6 to about 15 Å.

As synthesized, the molecular sieves of this invention will contain some of the structure directing or charge-balancing cations in the pores. These metals are described as exchangeable cations meaning that they can be exchanged with other (secondary), i.e., different cations (herein referred to as A'). Generally, the A exchangeable cations can be exchanged with A' cations, which include alkali metal cations ($K^+$, $Na^+$, $Rb^+$, $Cs^+$), alkaline earth cations ($Mg^{2+}$, $Ca^{2+}$, $Sr^{2+}$, $Ba^{2+}$), hydronium ion, ammonium ion, transition elements having a +2 or +3 valence, rare earth metals having a valence of +2 or +2 and mixtures thereof. The methods used to exchange one A cation with a different A' cation are well known in the art and involve contacting the molecular sieve with a solution containing the desired A' cation at exchange conditions. Exchange conditions include a temperature of about 25° C. to about 100° C. and a time of about 20 minutes to about 30 hours. More than one exchange may be necessary to achieve the desired level of A'.

The crystalline compositions of this invention are capable of separating mixtures of molecular species based on the molecular size (kinetic diameters) or on the degree of polarity of the molecular species. When the separation of molecular species is based on molecular size, the crystalline microporous composition is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, *Zeolite Molecular Sieves,* John Wiley and Sons (1974), p. 636.

When the separation is based on degree of polarity, it is generally the case that the more hydrophilic crystalline composition of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

To allow for ready reference, the different structure types and compositions of rare earth silicate microporous compositions have been given arbitrary designations of RESi-1 where the "1" represents a framework of structure type "1". That is, one or more rare earth silicate microporous composition with different empirical formulas can have the same structure type.

The X-ray patterns presented in the following examples were obtained using standard X-ray powder diffraction techniques. The radiation source was a high-intensity X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70° (2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of 100 X $I/I_o$, the above designations are defined as w=0–15; m=15–60; s=60–80 and vs=80–100.

In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

TABLE 1

RESi-1

| d-Spacing, Å | Intensity ($I/I_o$) |
| --- | --- |
| 15.6–16.1 | S |
| 8.9–9.3 | S |
| 5.8–6.1 | W |
| 4.5–4.7 | W |
| 3.9–4.1 | M |
| 2.9–3.1 | M/W |

TABLE 2

RESi-2

| d-Spacing, Å | Intensity ($I/I_o$) |
| --- | --- |
| 6.9–7.1 | S |
| 6.3–6.6 | S |
| 3.3–3.6 | S/M |
| 2.8–3.1 | M/W |
| 2.0–2.3 | M/W |

TABLE 3

RESi-4

| d-Spacing, Å | Intensity ($I/I_o$) |
| --- | --- |
| 15.1–15.6 | S |
| 8.8–9.2 | M |
| 5.1–5.4 | S/M |
| 3.7–4.0 | M |
| 3.5–3.7 | W |
| 2.9–3.1 | W |

TABLE 4

RESi-5

| d-Spacing, Å | Intensity (I/I₀) |
|---|---|
| 11.0–11.6 | S |
| 6.1–6.4 | S/M |
| 3.4–3.6 | M |
| 3.2–3.2 | M |
| 2.9–3.1 | M |
| 2.7–2.9 | S/M |

TABLE 5

RESi-6

| d-Spacing, Å | Intensity (I/I₀) |
|---|---|
| 11.9–12.7 | S |
| 6.0–6.3 | M |
| 3.0–3.2 | M |
| 2.8–3.1 | W |

TABLE 6

RESi-7

| d-Spacing, Å | Intensity (I/I₀) |
|---|---|
| 11.8–12.3 | S |
| 6.8–7.2 | S |
| 4.7–4.9 | M |
| 4.3–4.6 | S |
| 2.65–2.85 | M |

TABLE 7

RESi-8

| d-Spacing, Å | Intensity (I/I₀) |
|---|---|
| 11.2–11.8 | S |
| 6.5–6.9 | W |
| 6.1–6.5 | W |
| 5.05–5.3 | M/W |
| 2.6–2.9 | M/W |

TABLE 8

RESi-9

| d-Spacing, Å | Intensity (I/I₀) |
|---|---|
| 6.25–6.3 | S |
| 6.05–6.15 | S |
| 4.1–4.3 | S/M |
| 3.05–3.2 | M |
| 2.6–2.75 | M |
| 1.9–2.05 | W |

In order to more fully illustrate the invention, the following examples are set forth. It is to be understood that the examples are only by way of illustration and are not intended as an undue limitation on the broad scope of the invention as set forth in the appended claims.

EXAMPLE 1

K—Yb—Si—O (RESi-1) and (RESi-2)

To a solution prepared by dissolving 42.5 g of KOH in 69.8 g deionized water, there were added 51.7 g of colloidal silica (30 wt. %). The resulting solution was stirred and to it there was added dropwise a solution of 14.0 g of $YbCl_3 \cdot 6H_2O$ dissolved in 22.0 g deionized water. The resulting slurry was mixed for approximately 3 hours then transferred to a blender and homogenized for 1 minute. The final pH was 14 with a resulting gel composition of $$21K_2O:Yb_2O_3:14.29SiO_2:423.5H_2O.$$

Two aliquots of the reaction mixture were crystallized under autogenous pressure for 7 days at 150° C. and 225° C. The solid reaction products were isolated by filtration, washed with deionized water, and dried in ambient air. Chemical analysis of the product reacted for 7 days at 150° C. gave an empirical formula of:

$$K_{1.78}YbSi_{3.21}O_{8.81} \cdot 4.46H_2O.$$

This product was identified as RESi-1 and its x-ray diffraction pattern was characterized by the data presented in Table 1.

The aliquot digested at 225° C. for 7 days was analyzed and was found to have an empirical formula of:

$$K_{3.05}YbSi_{3.15}O_{9.32} \cdot 1.32H_2O$$

This product was identified as RESi-2 and its x-ray diffraction pattern was characterized by the data presented in Table 2.

EXAMPLE 2

K—Yb—Si—O (RESi-4)

To 293.0 g of deionized water there were first added 178.6 g KOH followed by 477.1 g colloidal silica (30 wt. %) with stirring. To the resulting solution, 58.7 g of $YbCl_3 \cdot 6H_2O$ dissolved in 92.5 g deionized water was added dropwise with mixing. The resulting slurry was mixed for approximately 2.75 hours. The final solution pH was 12.9 with a gel composition of:

$$21K_2O:Yb_2O_3:71.45SiO_2:423.5H_2O.$$

The reaction mixture was transferred to a Teflone® lined reactor and heated for 2.5 days at 200° C. The resulting solid reaction product was isolated by filtration, washed with deionized water, and dried at room temperature. Chemical analysis of this product gave an empirical formula of:

$$K_{2.82}YbSi_{5.53}O_{14.0} \cdot 9.41H_2O.$$

The X-ray powder diffraction pattern of this product, which contained approximately less than 10% of an unknown impurity, was characterized by the data presented in Table 3.

EXAMPLE 3

Na—Gd—Si—O (RESi-5)

A solution was prepared by dissolving 16.2 g NaOH (97%) in 37.7 g of de-ionized water followed by the addition of 27.6 g of colloidal silica (30 wt. %). A pre-mixed solution of 7.2 g $GdCl_3 \cdot 6H_2O$ dissolved in 11.4 g de-ionized water was then added dropwise while stirring. After 1.5 hours of stirring, the pH of the resultant solution was 13.7 and had an empirical formula of:

$$21Na_2O:Gd_2O_3:14.29SiO_2:423.5H_2O.$$

The reaction mixture was loaded into three 45 ml polytetrafluoroethylene lined reactors and heated to 225° C. for 3–7 days. The reactors were cooled to room temperature, opened, and combined to yield one sample. The solid product was isolated and washed by centrifugation and dried at 100° C. Elemental analysis showed the product to have the empirical formula:

$$Na_{2.05}GdSi_{3.06}O_{8.65} \cdot 2.34H_2O$$

The x-ray powder pattern of this product was characterized by the data presented in Table 4.

EXAMPLE 4

Na—Yb—Si—O (RESi-6)

A solution was prepared by dissolving 14.5 g of NaOH in 33.5 g de-ionized water to which there were added 24.8 g of colloidal silica (30 wt. %) with stirring. To the resulting solution there was added dropwise a pre-mixed solution of 6.7 g of $YbCl_3 \cdot 6H_2O$ in 10.5 g de-ionized water. The resulting mixture had a pH of 13.6 and an empirical formula of:

$$21Na_2O:Yb_2O_3:14.29SiO_2:423.5H_2O.$$

The reaction mixture was transferred to a Teflon® lined reactor and heated for 7 days at 150° C. The solid product was isolated and washed by centrifugation and dried at 100° C. Chemical analysis of this product gave the empirical formula:

$$Na_{2.75}YbSi_{3.24}O_{9.36} \cdot 3.78H_2O.$$

The X-ray powder diffraction pattern of this product, which contained approximately less than 10% of an unknown impurity, was characterized by the data presented in Table 5.

EXAMPLE 5

Na—K—Tb—Si—O (RESi-7)

To a solution of 5.2 g sodium silicate (27% SiO2) and 18.3 g de-ionized water there were added 0.2 g of KOH. To this solution, 0.3 g NaOH (97%) and 0.2 g NaCl (99+%) was added with stirring, followed by 2.4 g terbium nitrate pentahydrate (99.9%). The mixture was stirred for about 1 hour with a resultant pH of 11.5 and the following composition:

$$5.22Na_2O:0.70K_2O:Tb_2O_3:8.28SiO_2:433.02H_2O.$$

The reaction mixture was transferred to a Teflon® lined reactor and heated for 6 days at 230° C. The solid product was isolated by vacuum filtration, washed and dried in ambient air. Chemical analysis of this product gave the empirical formula:

$$K_{0.42}Na_{1.32}TbSi_{4.42}O_{11.21} \cdot 2.90H_2O$$

Microprobe analysis of the sample revealed a Si to M ratio of 8:1. The X-ray powder diffraction pattern of this product, which contained approximately less than 10% of the rare earth oxide, was characterized by the data presented in Table 6.

EXAMPLE 6

K—Gd—Si—O (RESi-8)

A solution was prepared by dissolving 42.6 g of KOH in 69.6 g deionized water to which there were added 51.8 g of colloidal silica (30 wt. %). To the resulting solution, 13.5 g of $GdCl_3 \cdot 6H_2O$ dissolved in 22.1 g deionized water was added dropwise with mixing. The slurry was mixed for approximately 2.5 hours then transferred to a blender and homogenized for 1 minute. The final mixture had a pH of 14 and the following composition:

$$21K_2O:Gd_2O_3:14.29SiO_2:423.5H_2O.$$

A portion of the reaction mixture was transferred to a Teflon® lined reactor and heated for 7 days at 225° C. The solid product was isolated by vacuum filtration, washed, and dried in ambient air. Chemical analysis gave the empirical formula:

$$K_{2.56}GdSi_{3.99}O_{10.77} \cdot 1.18H_2O.$$

The X-ray powder diffraction pattern of this product, which contained less than 10% of an unknown impurity, was characterized by the data presented in Table 7.

EXAMPLE 7

Na—Yb—Si—O (Yb—RESi-9)

A solution was prepared by dissolving 32.3 g of NaOH in 74.3 g deionized water. 55.0 g of colloidal silica (30 wt. %) was added to the resulting solution with stirring from a high-speed mixer. To the resulting solution, 14.9 g of $YbCl_3 \cdot 6H_2O$ dissolved in 23.5 g deionized water was added dropwise with mixing. The slurry was mixed for approximately 2.5 hours then transferred to a blender and homogenized for 1 minute. The final pH was 13.4 with a resulting gel composition of:

$$21Na_2O:Yb_2O_3:14.29SiO_2:423.5H_2O.$$

The reaction mixture was crystallized under autogenous pressure for 7 days at 225° C. The solid reaction product was isolated by filtration, washed with deionized water, and dried in ambient air. Chemical analysis of this product gave a formula of:

$$Na_{3.08}YbSi_{3.22}O_{9.98} \cdot 2.44H_2O.$$

The X-ray powder diffraction pattern of this product, which contained approximately less than 10% of an unknown impurity, was characterized by the data presented in Table 8.

EXAMPLE 8

$NH_4^+$ exchange of a RESi material (RESi-4)

A 2.2 M solution of $NH_4NO_3$ (aq.) was prepared. To this solution, approximately 10 gm of RESi-4 (Ex. 2) was added. The solution was shaken in a capped, polyethylene flask. The flask was set in a shaker bath set at 90° C. and shaken for a total time of approximately 4 days. Each day the solution was decanted and fresh 2.2 M $NH_4NO_3$ solution was added to the solid. After 4 days, the solid was vacuum filtered and washed with approximately 65° C. dilute $NH_4NO_3$ (aq) solution (pH—6.3). The sample was dried in ambient air. Chemical analysis of this product gave a formula of:

$$(NH_4^+)_{1.71}YbSi_{5.79}O_{13.09} \cdot 6.78H_2O$$

The X-ray powder diffraction pattern of this product, which contained approximately less than 10% of an unknown impurity, was characterized by the data presented in Table 3.

EXAMPLE 9

Na—K—Yb—Gd—Si—O (RESi-6)

A solution was prepared by dissolving 27.4 g KOH in 90.1 gm de-ionized water followed by the addition of 19.6 g NaOH. 66.7 g of colloidal silica (30 wt. %) was added to this solution with mixing. A separate solution was prepared by dissolving 8.7 g GdCl$_3$.6H$_2$O and 9.0 g YbCl$_3$.6H$_2$O to 28.5 g de-ionized water.

The rare earth solution was added dropwise to the initial solution while mixing. After 2 hours of stirring, the pH of the resultant solution was 13.6. The solution was homogenized in a high-speed mixer for 1 minute and had an empirical formula of:

$$10.5K_2O:10.5Na_2O:0.5Gd_2O_3:0.5Yb_2O_3:14.29SiO_2:423.5H_2O$$

A portion of the reaction mixture was loaded into a 45 ml polytetrafluoroethylene lined reactor and heated to 150° C. for 3 days. The solid product was isolated and washed by filtration and air dried. Elemental analysis showed the product to have the empirical formula:

$$Na_{1.59}K_{0.65}Gd_{0.50}Yb_{0.50}Si_{3.16}O_{8.94}\cdot 3.02H_2O$$

The x-ray powder pattern of this product was characterized by the data presented in Table 5.

EXAMPLE 10

K—Nb—Yb—Si—O (Nb doped RESi-1) and (Nb doped RESi-2)

To a solution prepared by dissolving 53.2 g of KOH in 87.3 g deionized water, there were added 0.56 g of Nb$_2$O$_5$xH$_2$O (LOI=45.4%) and 64.7 g colloidal silica (30 wt. %). The resulting solution was stirred and to it there were added 16.6 g of YbCl$_3$.6H$_2$O dissolved in 27.6 g deionized water dropwise. The resulting slurry was mixed for approximately 2 hours then transferred to a blender and homogenized for 1 minute. The final pH was 14 with a resulting gel composition of:

$$21K_2O:0.95Yb_2O_3:0.05Nb_2O_5:14.29SiO_2:423.5H_2O.$$

Two aliquots of the reaction mixture were crystallized under autogenous pressure for 7 days at 150° C. and 225° C. The solid reaction products were isolated by filtration, washed with deionized water and dried in ambient air. The product reacted for 7 days at 150° C. was identified as RESi-1. Its x-ray diffraction pattern was characterized by the data presented in Table 1.

The aliquot digested at 225° C. for 7 days was identified as RESi-2 with about a 10% impurity of RESi-1. Its x-ray diffraction pattern was characterized by the data presented in Table 2. Both of the above compositions were examined by EDS, which showed that niobium was incorporated into the framework.

EXAMPLE 11

Na—Ti—Gd—Si—O (Ti doped RESi-5) and (Ti doped RESi-6)

To a solution prepared by dissolving 0.5 TiCl4 in 93.5 g deionized water, there were added 40.5 g of NaOH (97%) and 69.0 g colloidal silica (30 wt. %). The resulting solution was stirred and to it there were added 17.0 g of GdCl$_3$.6H$_2$O dissolved in 29.5 g deionized water dropwise. The resulting slurry was mixed for approximately 3 hours then transferred to a blender and homogenized for 1 minute. The final pH was 13.6 with a resulting gel composition of:

$$21Na_2O:0.95Gd_2O_3:0.10TiO_2:14.29SiO_2:423.5H_2O.$$

Two aliquots of the reaction mixture were crystallized under autogenous pressure for 7 days at 150° C. and 225° C. The solid reaction products were isolated by filtration, washed with deionized water, and dried in ambient air. The product reacted for 7 days at 150° C. was identified as RESi-6. Its x-ray diffraction pattern characterized by the data presented in Table 5.

The aliquot digested at 225° C. for 7 days was identified as RESi-5 and its x-ray diffraction pattern was characterized by the data presented in Table 4. Both of the above samples were examined by EDS, which showed that titanium was incorporated into the framework.

We claim as our invention:

1. A crystalline microporous composition having a three dimensional framework structure of at least silicon tetrahedral oxide units and at least one M oxide unit and having an empirical formula on an anhydrous basis of:

$$A_n(M_{1-z}M'_z)_wSi_{1-y}Ge_yO_x$$

where A is a cation selected from the group consisting of alkali metals, alkaline earth metals, hydronium ion and mixtures thereof, "n" is the mole fraction of A and varies from about 0.5 w to about 4 w, M is at least one element selected from the group of rare earth elements, except when "z" is zero, M is not neodymium or yttrium, "z" is the mole fraction of M' and varies from 0 to about 0.99, M' is a metal having a valence of +2, +3, +4 or +5, "w" is the mole fraction of the sum of M and M' and varies from about 0.1 to about 0.5, "y" is the mole fraction of germanium and varies from 0 to about 0.99 and "x" has a value such that it satisfies the valence of the framework elements.

2. The composition of claim 1 where A is an alkali metal selected from the group consisting of potassium, sodium and mixtures thereof.

3. The composition of claim 1 further characterized in that the A cation has been exchanged with a secondary (A') cation selected from the group consisting of alkali metal ions, alkaline earth metal ions, hydronium ion, ammonium ion, a transition element having a valence of +2 or +3, a rare earth element having a valence of +2 or +3 and mixture thereof.

4. The composition of claim 1 where M is selected from the group consisting of yttrium, ytterbium, neodymium, praseodymium, samarium, gadolinium, terbium, dysprosium, holmium, europium, lutetium, promethium, erbium, cerium, lanthanum and thulium.

5. The composition of claim 4 where M is selected from the group consisting of neodymium, samarium, gadolinium, terbium, ytterbium, erbium, dysprosium, holmium, praseodymium, lanthanum, lutetium and mixtures thereof.

6. The composition of claim 1 where M' is selected from the group consisting of zinc (+2), iron (+3), scandium (+3), zirconium (+4), titanium (+4), niobium (+5), tantalum (+5), antimony (+5) and mixture thereof.

7. The composition of claim 1 further characterized in that it has pores having a diameter of about 2.5 to about 15 Å.

8. The composition of claim 1 where y is zero.

9. The composition of claim 1 where z is zero.

10. The composition of claim 1 where both y and z are zero.

11. A process for preparing a crystalline microporous composition having a three dimensional framework structure of at least silicon tetrahedral oxide units and at least one M oxide unit and having an empirical formula on an anhydrous basis of:

$$A_n(M_{1-z}M'_z)_wSi_{1-y}Ge_yO_x$$

where A is a cation selected from the group consisting of alkali metals, alkaline earth metals, hydronium ion and mixtures thereof, "n" is the mole fraction of A and varies from about 0.5 w to about 4 w, M is at least one element selected from the group of rare earth elements, except when "z" is zero M is not neodymium or yttrium, "z" is the mole fraction of M' and varies from 0 to about 0.99, M' is a metal having a valence of +2, +3, +4 or +5, "w" is the mole fraction of the sum of M and M' and varies from about 0.1 to about 0.5, "y" is the mole fraction of germanium and varies from 0 to about 0.99 and "x" has a value such that it satisfies the valence of the framework elements; the process comprising forming a reaction mixture containing reactive sources of A, M, silicon, optionally M' and optionally germanium, at a temperature and a time sufficient to form the crystalline composition, the mixture having a composition expressed in terms of mole ratios of oxides of:

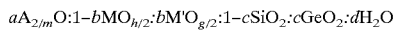

$$aA_{2/m}O:1-bMO_{h/2}:bM'O_{g/2}:1-cSiO_2:cGeO_2:dH_2O$$

where "a" has a value of about 1 to about 50, "m" is the valence of A and has a value of +1 or +2, "b" has a value from 0 to less than 1.0, "g" has a value of +2, +3, +4 or +5, "h" has a value of +3 or +4, "c" has a value from zero to less than 1.0 and "d" has a value from about 30 to about 2000.

12. The process of claim 11 further characterized in that the A cation is exchanged with a secondary (A') cation by contacting the composition with a solution containing at least one of said (A') secondary cations at exchange conditions thereby exchanging the A cation with the secondary (A') cation; the secondary (A') cation being selected from the group consisting of alkali metal ions, alkaline earth metal ions, hydronium ion, ammonium ion, a transition metal ion having a valence of +2 or +3, a rare earth ion having a valence of +2 or +3 and mixtures thereof.

13. The process of claim 11 where the temperature varies from about 50° C. to about 300° C. and the time varies from about 20 minutes to about 30 hours.

14. The process of claim 11 where the silicon source is selected from the group consisting of colloidal silica, fumed silica, tetraethylorthosilicate, sodium silicate and mixtures thereof.

15. The process of claim 11 where M is selected from the group consisting of yttrium, neodymium, praseodymium, samarium, gadolinium, terbium, dysprosium, ytterbium, holmium, europium, lutetium, promethium, erbium, cerium, lanthanum and thulium.

16. The process of claim 11 where the M source is selected from the group consisting of M halides, M nitrates, M acetates, M oxides, M hydrous oxides and mixtures thereof.

17. The process of claim 11 where M' is selected from the group consisting of zinc (+2), iron (+3), scandium (+3), zirconium (+4), titanium (+4), niobium (+5), tantalum (+5), antimony (+5) and mixtures thereof.

18. The process of claim 11 where the M' source is selected from the group consisting of M' halides, M' nitrates, M' acetates, M' oxides, M' hydrous oxides and mixtures thereof.

19. The process of claim 11 where the germanium source is selected from the group consisting of germanium oxide, germanium alkoxides and germanium tetrachloride.

20. The process of claim 11 where the A source is selected from the group consisting of halide, acetate, carbonate and hydroxide compounds of A.

* * * * *